United States Patent [19]

Zaugg

[11] Patent Number: 4,840,337
[45] Date of Patent: Jun. 20, 1989

[54] SUPPORT FORMED OF RIGID PLASTIC MATERIAL

[75] Inventor: Hans Zaugg, Derendingen, Switzerland

[73] Assignee: ETA SA Fabriques d'Ebauches, Switzerland

[21] Appl. No.: 190,845

[22] Filed: May 6, 1988

[30] Foreign Application Priority Data

May 8, 1987 [CH] Switzerland ............ 01769/87

[51] Int. Cl.$^4$ ............................................. A47F 7/02
[52] U.S. Cl. ............................... 248/115; 248/205.3
[58] Field of Search ............ 248/205.3, 205.4, 309.1, 248/309.2, 359 A, 114, 115, 360, 230, 231, 467, 218.4; 24/304, DIG. 11

[56] References Cited

U.S. PATENT DOCUMENTS

| 1,560,029 | 11/1925 | Erickson | 248/467 |
|---|---|---|---|
| 2,658,246 | 11/1953 | Mahler . | |
| 2,679,998 | 6/1954 | Keller . | |
| 2,844,387 | 7/1958 | Shaw | 24/DIG. 11 |
| 2,975,538 | 3/1961 | Murfin | 24/304 |
| 3,203,653 | 8/1965 | Hall | 248/DIG. 9 |
| 3,309,052 | 3/1967 | Borisof | 24/304 |
| 3,476,257 | 11/1969 | O'Connell | 248/205.3 |
| 3,503,568 | 3/1970 | Galley | 24/DIG. 11 |
| 3,696,920 | 10/1972 | Lahay | 248/205.3 |
| 4,025,015 | 5/1977 | Kolic | 248/205.3 |
| 4,070,735 | 1/1978 | Canady | 24/304 |
| 4,125,243 | 11/1978 | Liptak | 248/205.3 |
| 4,168,067 | 9/1979 | Wiczer | 248/221.4 |
| 4,299,223 | 11/1981 | Cronkite | 24/304 |
| 4,474,386 | 10/1984 | Kanemaki . | |

FOREIGN PATENT DOCUMENTS

| 897426 | 3/1945 | France . | |
|---|---|---|---|
| 68212 | 12/1913 | Switzerland | 248/115 |
| 913107 | 12/1962 | United Kingdom . | |

Primary Examiner—Alvin C. Chin-Shue
Assistant Examiner—Robert A. Olson
Attorney, Agent, or Firm—Pollock, Vande Sande & Priddy

[57] ABSTRACT

The support of this invention includes a pellet of rigid plastic material. The pellet has two opposed faces one of which bears a coupling means, the other being covered by a layer of adhesive material with an interposed layer of flexible material. The pellet exhibits grooves defining flexure zones. The support may thus be fastened to non-planar surfaces.

20 Claims, 2 Drawing Sheets

SUPPORT FORMED OF RIGID PLASTIC MATERIAL

This invention concerns a support provided with a pellet of rigid plastic material. This pellet is provided with two faces, one of which bears a coupling means and the other of which is covered with a layer of adhesive material.

BACKGROUND OF THE INVENTION

Supports of this type are known. They may be readily fastened by simple pressure onto a planar surface. Unfortunately as soon as the surface is curved or warped, adhesion is no longer possible.

The purpose of this invention is to enable the fastening of such a support as readily onto a curved or warped surface as to a planar surface.

SUMMARY OF THE INVENTION

This purpose is attained by the provision of a support including a pellet of rigid plastic material having two opposed faces one of which bears a coupling means and the other of which is covered with a layer of adhesive material, said pellet exhibiting a groove defining a flexure zone.

The invention will be readily understood following reading of the description to follow having reference to the accompanying drawings.

DESCRIPTION OF THE PREFERRED EMBODIMENTS

Figure 1:
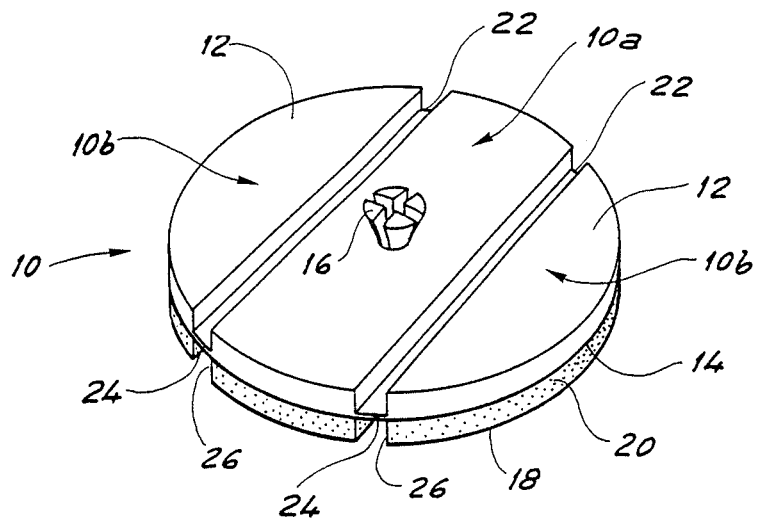
FIG. 1 shows in perspective a support according to a first embodiment of the invention.
Figure 2:
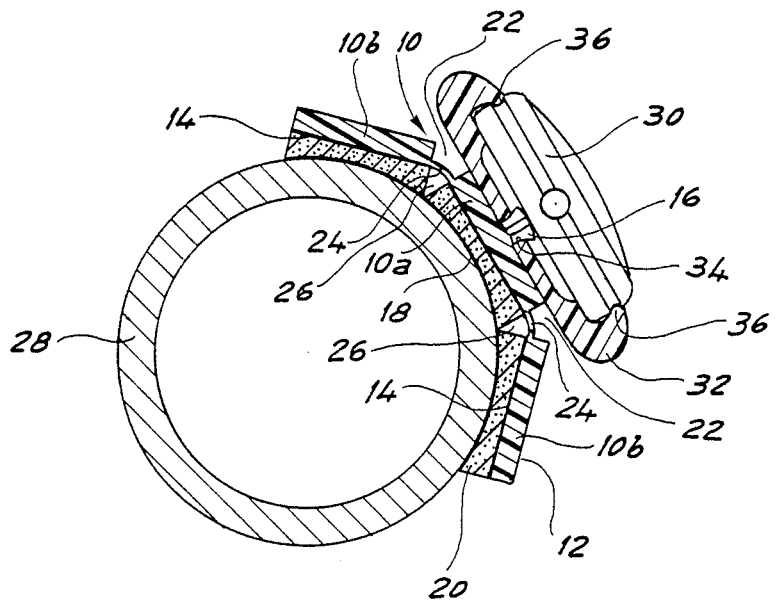
FIG. 2 is a cross-section of the support of FIG. 1 fixed onto a tube.

The support shown in FIGS. 1 and 2 includes a pellet 10 of plastic material having an upper face 12 and lower face 14, a coupling means 16 integral with the upper face 12 as well as a layer of adhesive material 18 which covers the lower face 14 with the interposition of a layer of flexible material 20.

The upper face 12 of the pellet 10 exhibits furthermore two parallel grooves 22 situated on either side of the coupling means 16. These grooves are such as to leave remaining only a thin and flexible bridge of material 24 between the central portion 10a of the pellet 10 and the lateral portions 10b forming flexure zones.

The layers of flexible material 20 and adhesive material 18 are advantageously interrupted facing the grooves 22, thus defining slots 26 parallel to the grooves 22.

In view of this special configuration, the support may be fixed onto a cylindrical surface such as the tube 28 shown on FIG. 2. In view of the presence of bridges 24, the outer portions 10b of the pellet 10 may be folded back thus to surround the tube 28. The layer of flexible material 20 enables the adhesive layer 18 to conform to the form of the cylindrical surface. Furthermore, the slots 26 prevent the layers 18 and 20 from forming wrinkles when the fold back is substantial, which could spoil the adhesion of the support.

The radius of curvature of the holding surface may be small, smaller even than the radius of the pellet 10. It is thus possible to fasten such a support to the handle bar of a bicycle in particular, in order to mount thereon various accessories such as a watch 30 for instance as may be seen in FIG. 2.

To this effect, the coupling means 16 is formed of a split stud capable of radial deformation and formed of material from the pellet 10. The watch is fastened by means of a coupling member 32 provided with a hole 34 in which the coupling means 16 is snap engaged and from clamps 36 retaining the watch 30 by its case.

Figure 3:
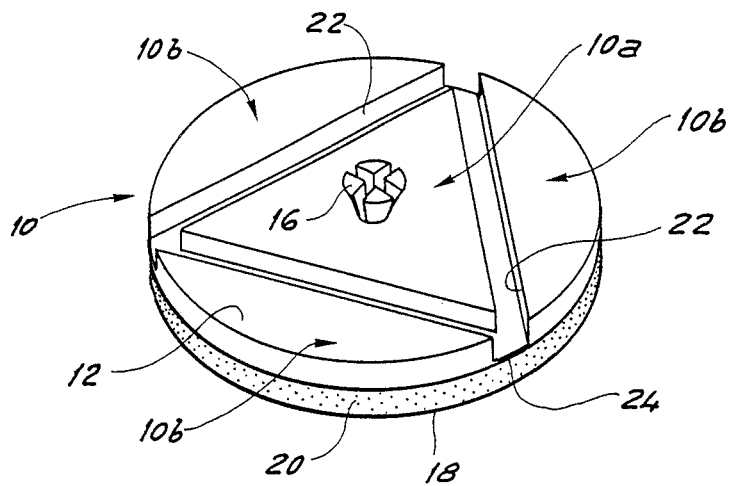
FIGS. 3 and 4 are perspective views of supports according to the second and third embodiments of the invention.

The support shown in FIG. 3 likewise comprises a pellet 10 with an upper face 12 and a lower face 14, a coupling means 16 and a layer of adhesive material 18 which covers the lower face 14 with interposition of a layer of flexible material 20. The pellet 10 in the same manner exhibits grooves 22. The latter are no longer parallel but form a triangle at the center of which may be found the coupling means 16. The arrangement of three grooves in a triangle enables the adaptation of the support to a warped surface, for instance a headlight, a fuel tank of a motorcycle or a vase.

Figure 4:
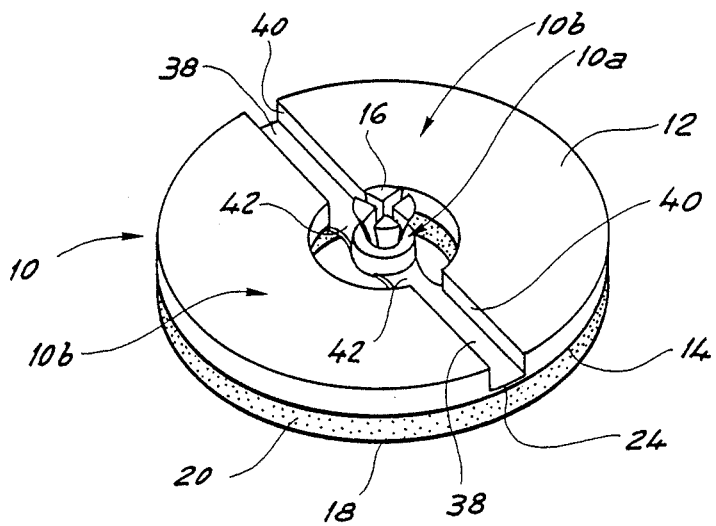

The support shown on FIG. 4 differs from the two previous embodiments insofar as it includes a central portion 10a of cylindrical form and two outer portions 10b in the form of a sector of a crown surrounding the central portion 10a. The outer portions 10b are coupled to one another by two bridges 38 thus defining two grooves 40. Bridges 42 furthermore couple the bridges 38 to the central portion 10a of the pellet. They are to be seen in the elongation of bridges 38.

A support of this type may be fixed to a body having a ridge or into a corner.

Although not shown on FIGS. 3 and 4, it is self-evident that the supports may likewise be provided with slots facing the grooves.

Supports according to the invention could furthermore be formed in accordance with numerous further variants. Thus the outer portions 10b of pellet 10 could have a thickness less than that of the portion 10a without weakening the support.

The support could also include a greater number of grooves. It would thus be possible to add to the support of FIG. 3 an additional groove parallel to one of grooves 22.

In the various embodiments which have been described, the pellet 10 may advantageously be formed of an acetal resin such as Delrin 100ST of the Dupont de Nemours Company (USA). The layer of flexible material may be of polyethylene, or polyvinyl or polyurethane, the two surfaces of which are coated with an acrylic glue.

What I claim is:

1. A support comprising:
    a pellet of rigid plastic material having two opposed faces and comprising a rigid central portion and a pair of rigid outer portions, each of said rigid outer portions being connected to said rigid central portion by a flexible bridge formed by at least one elongated groove in said pellet;
    a coupling means on one of said opposing faces; and,
    a layer of adhesive material on the other of said opposing faces, a part of said adhesive layer being on each of said rigid outer portions, and said flexible bridge permitting each of said rigid outer portions to be adhered to a planar surface when said rigid outer portions are aligned with said rigid central portion and to be adhered to a non-planar surface when said rigid outer portions are folded back relative to said rigid central portion such that said coupling means can be fastened to a corresponding one of said surfaces.

2. A support as set forth in claim 1 which includes three grooves arranged in a triangle, the center of the triangle being occupied by the central portion.

3. A support as set forth in claim 1 wherein the coupling means is formed of material from the pellet.

4. A support as set forth in claim 1 wherein the pellet is formed from an acetal resin.

5. A support as set forth in claim 1 wherein said coupling means is carried on said rigid central portion.

6. A support as set forth in claim 1 which includes two parallel grooves extending on either side of the central portion.

7. An assembly intended to be fixed to a handlebar and including a support as set forth in claim 6 in which the coupling means includes a radially and elastically deformable stud and a watch the lower surface of which is provided with a coupling member including an opening in which the stud is snap engaged.

8. A support as set forth in claim 1 wherein a layer of flexible material is interposed between the layer of adhesive material and the pellet.

9. A support as set forth in claim 8 which includes three grooves arranged in a triangle, the center of the triangle being occupied by the central portion.

10. A support as set forth in claim 8 wherein a second layer of adhesive material is interposed between said layer of flexible material and the other of said opposing faces of said pellet.

11. A support as set forth in claim 8 which includes two parallel grooves extending on either side of the central portion.

12. An assembly intended to be fixed to a handlebar and including a support as set forth in claim 11 in which the coupling means includes a radially and elastically deformable stud and a watch the lower surface of which is provided with a coupling member including an opening in which the stud is snap engaged.

13. A support as set forth in claim 1 wherein a part of said adhesive layer is on said rigid central portion so that said rigid central portion can be adhered simultaneously with said outer portions to said corresponding one of said surfaces.

14. A support as set forth in claim 13 wherein a layer of flexible material is interposed between the parts of said adhesive layer on said rigid central portion and on said rigid outer portions.

15. A support as set forth in claim 14 wherein a second layer of adhesive material is interposed between said layer of flexible material and the other of said opposing faces of said pellet.

16. A support as set forth in claim 14 wherein said coupling means is carried on said rigid central portion.

17. A support as set forth in claim 14 wherein the layers of flexible material and adhesive material are interrupted so as to form a slot arranged facing each groove exhibited by the pellet.

18. A support as set forth in claim 14 which includes three grooves arranged in a triangle, the center of the triangle being occupied by the central portion.

19. A support as set forth in claim 14 which includes two parallel grooves extending on either side of the central portion.

20. An assembly intended to fixed to a handlebar and including a support as set forth in claim 19 in which the coupling means includes a radially and elastically deformable stud and a watch the lower surface of which is provided with a coupling member including an opening in which the stud is snap engaged.

* * * * *

UNITED STATES PATENT AND TRADEMARK OFFICE
CERTIFICATE OF CORRECTION

PATENT NO. : 4,840,337

DATED : June 20, 1989

INVENTOR(S) : Hans Zaugg

It is certified that error appears in the above-identified patent and that said Letters Patent is hereby corrected as shown below:

```
Column 4, line 32, after the first occurrence of "to"
insert --be--.
```

Signed and Sealed this

Twenty-seventh Day of March, 1990

Attest:

JEFFREY M. SAMUELS

*Attesting Officer*     *Acting Commissioner of Patents and Trademarks*